Feb. 25, 1958  N. R. OREBAUGH  2,824,389
EDUCATION DEVICE
Filed Dec. 29, 1955
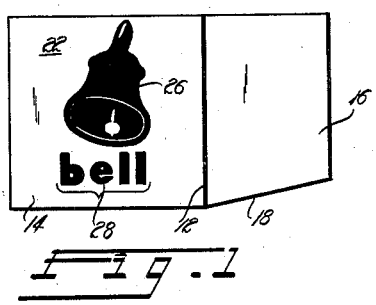
Fig. 1
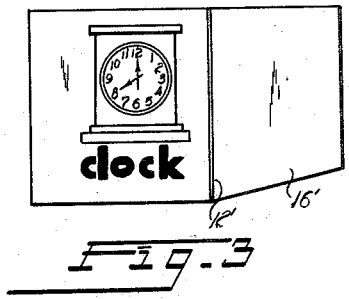
Fig. 3
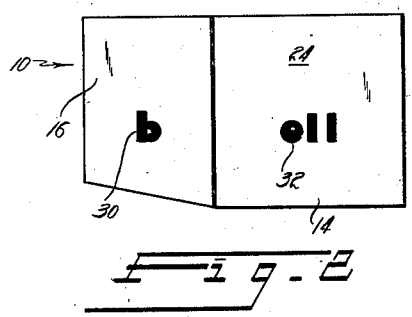
Fig. 2
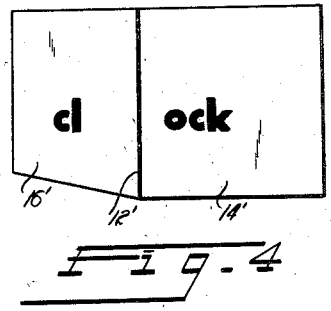
Fig. 4
Fig. 5
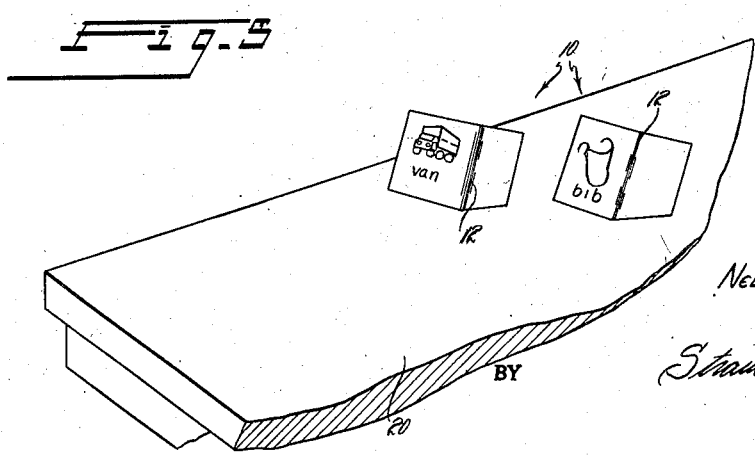
INVENTOR
NELLE R. OREBAUGH
BY
ATTORNEYS
United States Patent Office 2,824,389
Patented Feb. 25, 1958

2,824,389

EDUCATION DEVICE

Nelle R. Orebaugh, Columbus, Ohio

Application December 29, 1955, Serial No. 556,317

5 Claims. (Cl. 35—35)

This invention relates to an educational device and more particularly to reading cards used to develop visual, auditory and speech discrimination and to improve spelling.

Reading cards have been used for many years and numerous types and forms have been proposed one of which can be seen in United States Letters Patent No. 1,326,695. Many of the prior art devices recognize various phases of the visual aids used in the present invention such as sight recognition of objects and words and identical family sounds or words in a group of words; for example the family word "and" can be found in the group of words including "sand," "land" and "band."

As a result of years of educational research and teaching in sight classes the applicant has determined that to develop good reading skill a person, particularly a child, must develop visual, auditory and speech discrimination. The system used to develop such skill must be one that will maintain the child's interest. It must present a matched picture and word representation of the object. The picture should be large and true and the word must be presented in large clear letters in close proximity to the object picture. Because it has been determined that a child will rapidly learn words by groups and sounds as well as by inspection and comparison, the best system should also present a split word representation of the word that appears with the picture. The split word should appear in two offset letter groups on a single card surface, one of the offset groups constituting a group of letters forming a word or sound that appears in a family of words.

Applicant has recognized the problems and factors involved and has conceived a novel simplified inexpensive versatile means for utilizing the numerous factors involved in successfully teaching and improving reading and spelling. The basic unit of the invention is a small preferably light colored card that can be easily handled yet is of sufficient size to have a relatively large dark colored pictorial representation of an object on one side with a heavy, clearly legible, printed word representation of that object in close proximity and preferably below the pictorial representation. The picture holds the child's interest and, as one fundamental of elementary education is to teach a child to read from the top to the bottom of a page, the picture should be above its word representation. On the reverse side of the card, the same word is again printed in heavy clearly legible characters with the initial letter or letters offset to the left of the remaining group of letters. The picture is preferably in silhouette form since applicant has determined that dark silhouettes tend to enlarge and give a true representation of the object being depicted.

The present invention further contemplates the use of a plurality of individual cards, each a complete unit in itself and not requiring separate parts to be matched with partial words, to give the pictorial, word, and family derivation of that word. Separate matching parts have a primary disadvantage of being lost. The offset family breakdown is placed on the rear of the card where it does not detract the student or child's attention from the basic picture and word appearing on the front of the card.

An additional aspect of each card is its ability to stand by itself, enabled by an angular cut at one corner and a scored or pressed vertical hinge line, proximate the start of the angular cut, resulting in a main body and a hinged flap that serves as a stand at one side. This feature is an aid in several respects. It enables the teacher or student to erect words and pictures for ease in viewing. It provides a clear division line for the offset parts of the word in the rear face of the card. And, it serves as an object of manipulation to help maintain the student's (children) interest.

In addition to the above important advantages of this invention over known prior art reading cards, the placing of one individual word, an offset representation of that word and a picture identifying the word object on a single card requires the student to recognize and group the various words in a family of words, rather than present such families of words already grouped on a single card, as is true in some systems and which tends to confuse the child. This feature provides the further advantage of being able to use two cards for double meaning words such as bat (baseball and mammal) and hose (garden and wearing apparel).

Using a single card or a group of cards constructed according to this invention, reading classes can utilize the important mode of teaching by looking, seeing, saying and hearing; and learning to read becomes an exciting game—not a chore. This has been proved in educational testing laboratories by thorough tests which have resulted in wide acceptance by various state institutions for kindergarten through the fourth grade.

Accordingly a primary object of this invention resides in the provision of a novel reading card.

A further object resides in providing a novel reading card having a light colored surface with dark colored pictorial and word representations placed thereon, the pictorial representation and word representation of an object appearing on one face of the card and the same word, with an initial portion of single or plural letters offset from the balance of the word, appearing on the reverse face of the card.

Another object resides in providing such a reading card with a vertical hinge line enabling a portion of the card to serve as a support, the hinge line also serving to clearly separate the offset portions of the word on the reverse face of the card.

Still another object resides in providing a group of such novel reading cards having a plurality of repeated family letter groups as one of the offset portions of the word on the reverse face of the card.

Further features and objects of this invention will become apparent from the appended claims and the detailed description taken in conjunction with the attached drawing in which:

Figures 1 and 2 illustrate a front and reverse face respectively of a reading card constructed according to this invention, the word "bell" having a single initial letter "b" offset from the family name "ell";

Figures 3 and 4 are similar to Figures 1 and 2, and illustrate a front and reverse view of a second reading card using an object, the word representation of which has two initial letters "cl" with a family word of "ock"; and Figure 5 illustrates several of the reading cards of this invention in a standing position on a work surface.

With reference to the drawing, the reading cards 10 of the preferred embodiment are white surface cards substantially similar in thickness and size to what are termed standard 3 x 5 business cards.

Each card 10 is pressed or otherwise scored in a vertical line 12 approximately ⅓ of the distance from the right hand edge, to provide a weakened section serving as a hinge line, and dividing the card 10 in two sections, a main body 14 and a supporting flap 16. The lower edge 18 of flap 16 is cut at a slight angle, relative to the lower edge of main card body 14, starting substantially at the point where the vertical hinge line 12 intersects the bottom edge. This angle cut enables the card 10 to be placed in an erect standing position with a slight rearward inclination, when flap 16 is bent backward to provide a support for the card as shown in Figure 5.

In the standing position on a table or desk work surface 20, as in Figure 5, the front face 22 of the reading card 10 is readily visible to a student viewer while the teacher can view the rear face 24 of the card, or an individual working alone can easily turn the card to view the rear face.

With particular reference to Figures 1 and 2, a pictorial representation 26 of an object and the word 28 representing that object are placed, as by printing, on the front face 22 of the main card body 14. The same word is placed on the reverse face 26 of the card with the initial letter 30, offset to the left of the hinge line 12 on the flap 16 and the family letter group 32 approximately centered on the main card body 14. The pictorial representation 26 of the object is preferably black, as large as feasible and as close to a silhouette as permitted by the nature of the object. Large, legible, preferably black lettering is also used and the complete word 28 on the front face should be directly under the pictoral object 26. Note that cards and representation thereon can be light and dark contrasting colors but white and black is preferred.

Not all of the common words can be easily broken into family word groups by setting off a single initial letter in the word. Such words start with what is termed blended letters, one example being illustrated in Figures 3 and 4 where the object is a clock. In this instance "ock" is the family word group on the rear face of the main card body 14' and the initial blended letters "cl" are offset, to the left of hinge line 12', on flap surface 16' (Figure 4). Note, the clock pictorial representation is one that is best illustrated in line drawing rather than silhouette.

Although instruction in looking, seeing, saying and hearing can be given to a child, using only one card, the preferred use contemplates the use of a large number of cards, and sets of 200 or more are contemplated for normal school and home use.

A suggested mode of use of a series of these reading cards is:

USE IN SCHOOL OR HOME

1—Look at the picture and say the word.
2—Find the animals.
3—Find the fowls or the ones with feathers.
4—Find the things that fly.
5—Find the things that swim.
6—Find the things to eat.
7—Find the things to wear.
8—Find the things to play with.
9—Find the people.
10—Find the things that have wheels.
11—Find the things that give light.
12—Find the things used on a farm.
13—Find parts of the body.
14—Find things used in the house.
15—Find things in which we carry things.
16—Find things mother uses when she sews or knits.
17—Find the rhyming words.
18—Find words that go together—as sun—moon; dish—spoon.
19—Find words that start with *b*—as ball, bat, etc.
Say the words.
Proceed the same with *c* words, *d* words, etc. After the children are familiar with initial sounds—take the family words or the endings.
20—Find words that end with *an, at, ag, ap, ar, am.*
21—Find words that end with *ed, en, og, ox, un, ub, up, op,* etc.
22—Find words that end with *ail, oat, ing, ose, eat,* etc.
23—Find words that have double *o.*
24—Find words that have double *e.*
25—Find words that have double *l.*
26—Find words that end with *ouse, est, ive, ack, ook, uck, oon,* etc.

Blends

27—Find words that start with *bl, br, ch, cl, cr, dr, fl, fr, gl, gr, pl, pr, qu, sc, sh, sk, sl, sm, sn, sp, st, sw, th, tr, tw, wh.*
28—Later on the teacher may make small cards with directions as:

Find the things to eat.
Find the things to wear.

Pass these direction cards to the different groups or individuals or write the directions on the chalkboard.

29—Children may use these cards to learn to arrange the words alphabetically.
30—Children enjoy making books by drawing pictures and writing words under the pictures.
Make a rhyming book.
Make a consonant book.
Make a blend book.
31—Read nursery rhymes or have the children say or sing them and find the pictures to go with the rhymes.

*Example.*—Hey, diddle, diddle, The cat and the fiddle, The little dog laughed, To see such sport—

32—Read nursery rhymes to the children and have them write on paper or the board the card words they hear in the rhyme.

With the foregoing description and explanation of this invention in mind it is clear that the applicant has provided a new reading card that contains pictorial and word representations of objects familiar to a child or student. The words are reproduced on a reverse face of the card in a manner to facilitate family word grouping, thus incorporating all elements necessary for visual and audible comparison and discrimination for gaining rapid knowledge of excellent speech habits, gaining an ability to recognize words by family relationship and improving spelling habits. The pictorial and word representations are of dark composition on a light background and are large and clearly defined. Where possible the pictorial representations are in silhouette to give proper form to the object without visual strain. The reading cards have a special form providing self support to enable them to stand on a flat surface for multiple comparison. The pictures and folded flap stand provide factors that give the reading card added interest insofar as children are concerned to thereby maintain their interest. These reading cards make learning to read a pleasure and not a chore.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An educational device comprising: a plurality of reading cards having a light surface color; each card having a large pictorial representation of an object in dark color on one face, a word representation of the object in large, legible print on said one face below and in close proximity with said pictorial representation, and a split representation of said word representation in dark colored, large, legible print on the other face of said card; a vertical hinge in each card intermediate the side edges of said card, denoted by a visual surface irregularity appearing at least on said other face and passing between portions of said split representation; one portion of said split representation comprising a group of letters belonging to a sound family; said plurality of cards consisting of a plurality of small groups of cards, each individual group containing words in which said one portion of said split representation is identical.

2. An educational device as defined in claim 1, wherein: said vertical hinge is closer to one side of said card than to the other side, to thereby provide a main card body and a flap; said pictorial representation and said word representation are disposed on the face of said main card body that appears to the left of said flap; and the split representation on the other face of said card will appear with its initial offset portion on the face of said flap disposed to the left of the main card body.

3. An educational device comprising: a reading card having a light surface color; a pictorial and word representation of an object disposed on one face of said card and a split representation of said word representation disposed on the reverse face of said card; the pictorial and both word representations being large and legible and comprising a material having a dark surface color; a vertical hinge means in said card, disposed intermediate the side edges of said card and denoting a vertical visual surface irregularity at least on said other face passing between the two portions of said split representation.

4. A reading card as defined in claim 3, wherein: said vertical hinge means is formed by scoring said card.

5. An educational device comprising: a reading card having a light surface color; a pictorial and word representation of an object disposed on one face of said card and a split representation of said word representation disposed on the reverse face of said card; the pictorial and both word representations being large and legible and comprising a material having a dark surface color; a vertical hinge means in said card disposed intermediate the side edges of said card and denoting a visual vertical surface irregularity at least on said other face passing between the two portions of said split representation; and a bottom edge of one of said portions being inclined relative to the bottom edge of the other of said portions.

References Cited in the file of this patent

UNITED STATES PATENTS

| | | |
|---|---|---|
| 140,722 | Muldaur | July 8, 1873 |
| 969,309 | Tuck | Sept. 6, 1910 |
| 1,019,545 | Southworth | Mar. 5, 1912 |
| 1,224,742 | Hillyer | May 1, 1917 |
| 1,326,695 | Schwarz | Dec. 30, 1919 |
| 1,445,819 | Boyle | Feb. 20, 1923 |
| 1,755,853 | Waring | Apr. 22, 1930 |

FOREIGN PATENTS

| | | |
|---|---|---|
| 163,929 | Great Britain | June 2, 1921 |
| 255,129 | Great Britain | July 12, 1926 |
| 393,900 | Germany | Apr. 11, 1924 |